June 12, 1945.   E. R. DETRICK   2,378,000
TRIM PANEL
Original Filed July 29, 1940

INVENTOR.
EDWARD R. DETRICK
BY Whittemore Hulbert Belknap

ATTORNEYS

Patented June 12, 1945

2,378,000

UNITED STATES PATENT OFFICE 2,378,000

TRIM PANEL

Edward R. Detrick, Detroit, Mich., assignor to National Automotive Fibres, Inc., Detroit, Mich., a corporation of Delaware Application September 27, 1943, Serial No. 503,994, which is a division of application Serial No. 348,291, July 29, 1940. Divided and this application May 1, 1944, Serial No. 533,577

11 Claims. (Cl. 45—138)

This invention relates generally to trim panels, especially decorated trim panels for the interior of doors and other portions of vehicle bodies, and constitutes a division of my application filed September 27, 1943, bearing Serial No. 503,994, which is a division of my application filed July 29, 1940, bearing Serial No. 348,291, which has now become U. S. Patent No. 2,334,811.

It is sometimes desirable to cover trim panels and other interior trim of automotive vehicles with fabrics of different colors or shades so as to provide a two-tone or multiple-tone effect. In the past this has been accomplished by sewing the two fabrics together to provide a composite fabric, which may then be applied to trim panels or other interior portions of the vehicle. However, the sewed seam between the two different fabrics presented an unattractive appearance, and efforts were made to conceal this seam. One manner of concealing the seam was to provide a metal molding strip which was tacked through the fabric to the panel board and was intended to overlie and conceal the seam. Obviously the seam had to be perfectly straight, and while there was no difficulty in sewing straight seams, the application of the composite fabric to the panel board had to be carried out with extreme care, so that the seam could be covered by a narrow strip of molding metal.

According to the present invention, two pieces of fabric which are to be united for a composite interior trim fabric are connected by means of an anchorage strip of a particular design, as will subsequently be pointed out. As a result, this strip insures that the seam or line of juncture between the pieces of fabric will be straight both before and after the composite fabric has been applied to the panel board.

In addition, this anchorage strip serves as a reinforcing means for the panel, so that by employing my improved construction it is possible to use a lighter and therefore less expensive foundation panel board.

A number of different effects may be obtained by slightly modified forms of anchorage strip, however at the present time it is sufficient to mention that by employing my improved anchorage strip, it is possible to obtain the effect of a molding strip. It is further possible to obtain a bead or riser intermediate two pieces of fabric which is covered with a different contrasting or harmonizing material.

It may also be pointed out that, if desired, the anchorage strip may be curved to any desired configuration so as to obtain different decorative designs.

With the foregoing general remarks in mind, it is an object of the present invention to provide two-tone trim panels of novel characteristics.

It is a further object of the invention to provide novel means for securing two pieces of fabric together.

It is a further object of the invention to provide trim panels characterized by the provision of contrasting or harmonizing fabrics in conjunction with an anchorage strip having a exposed riser of novel design.

It is a further object of the invention to provide a trim panel provided with reinforcing anchorage strips, which also were utilized to interlock adjacent pieces of trim fabric.

It is a further object of the present invention to provide a fabric having a stiff bead permanently united to one edge thereof along a line which may be straight or of predetermined curvature.

Other objects of the invention will be apparent as the description proceeds, and when taken in conjunction with the accompanying drawing, wherein.

Figure 1:
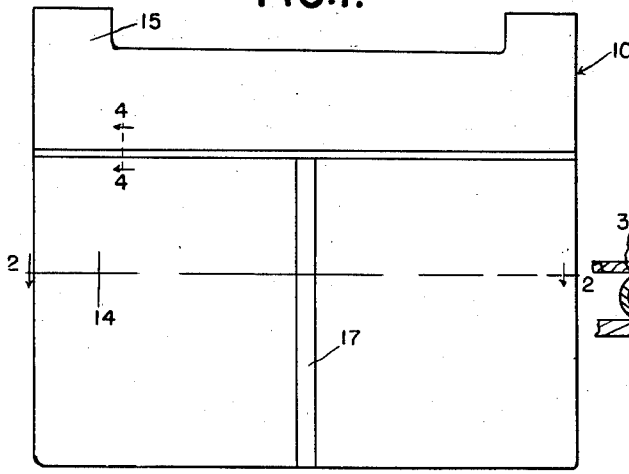
Figure 1 is a front elevation of a trim panel illustrating the possible design which may be obtained by the present invention.
Figure 2:
Figure 2 is a section on the line 2—2, Figure 1.

Referring first to Figures 1 and 2, I have illustrated generally at 10 an upholstered trim panel comprising a panel board 11, padding material 12, trim fabrics 13, 14 and 15, and metallic locking strip 16.

It will be understood that the padding material 12 may be of any desired type. The foundation panel board 11 may be an asphalt board or a panel board sold under the trade name Masonite. The padding material 12 may be wadding of a suitable type, or it may be loosely aggregated cotton, jute, or other fibrous material. The purpose of the padding material is to give an appearance of richness to the completed panel which is otherwise not obtained.

Panels of this type are adapted to be secured to doors of vehicles and it is to be understood that while I have illustrated my invention as applied to a trim panel for attachment to a door, the invention is not thus limited. The invention may be applied to other panels, and in fact, as will be obvious, its application is more or less general. Thus it may be used for decorative trim in vehicles, homes, stores, theatres and the like.

By way of example, the trim panel illustrated in Figures 1 and 2 may be covered by a composite trim fabric made up of the fabric pieces 13, 14 and 15. The upper piece 15 may, for example, be of a dark tone, whereas the pieces 13 and 14 may be of a harmonizing or contrasting color or shade.

The metallic strip 16 has a bead or riser 17 intermediate the pieces of fabrics 13 and 14 which is exposed and which may, of course, be chromium plated or otherwise treated to present an attractive appearance.

Figure 3:
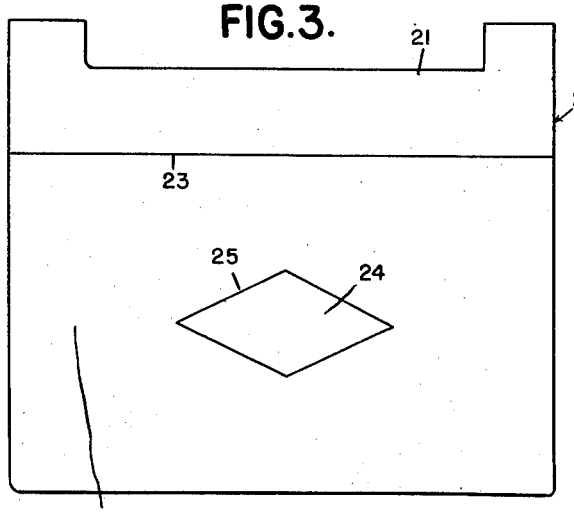
Figure 3 is a front elevation illustrating a somewhat different specific design of trim panel.

In Figure 3 I have illustrated a somewhat different design for the purpose of indicating the flexiblity of the present invention. In this case the trim panel indicated generally at 20 may be covered with a composite trim fabric comprising an upper portion 21, which may be of a definite color, and a lower portion 22 which may be of a harmonizing or contrasting color. The pieces 21 and 22 are secured together along the line 23, and a metallic strip of the type disclosed herein is employed. Intermediate the lower portion 22 I provide a decorative fabric insert 24 which may be of the same color as the upper portion 21, or of a different harmonizing or contrasting color. The lines of conjuncture 25, between the insert 24 and the fabric 22, are formed by metallic strips such as 16 or by strips similar to that illustrated in Figure 4.

It may be stated at this time that while the invention is most readily practiced in a manner to provide straight-line seams of the conjunctures, it need not be limited thereto, and it is within the contemplation of the present invention that the metallic strip may be curved transversely to provide curved or irregular lines of conjunctures between the various pieces of fabric.

Figure 4:
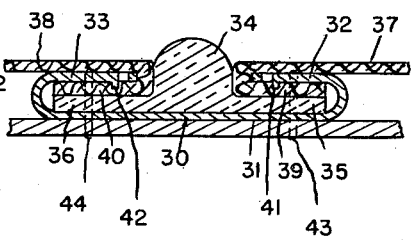
Figure 4 is a sectional view taken on the line 4—4 of Figure 1.

Referring now to Figure 4 I have shown a metal strip 30 having a flat base 31 provided at opposite longitudinal side edges thereof with open return bent flanges 32 and 33, respectively. A solid bead or riser 34 formed from plastic material is located on the base 31 between the flanges 32 and 33 and has lateral flanges 35 and 36, respectively, between the flanges 32, 33 and the base 31 of the strip. The fabrics 37 and 38 extend over the flanges 32 and 33 of the strip and have inturned or folded edge portions 39 and 40, respectively, clamped between the flanges 32, 33 of the strip and the flanges 35, 36 of the bead.

If desired tangs 41 and 42 may be struck out from the flanges 32 and 33 of the strip to pierce and hold the inturned edge portions 39 and 40 of the fabrics 37 and 38 to prevent displacement of the latter relative to the strip. Also, suitable fastening elements such as staples 43 and 44 may extend through the flanges 32, 33 of the strip, through the inturned edge portions 39, 40 of the fabrics, through the flanges 35, 36 of the bead, and through the base 31 of the strip for engagement with the panel board 11 to hold the parts in assembled relation. In this construction the tangs 41 and 42 and staples 43 and 44 are also beneath and concealed by the fabrics 37 and 38.

Figure 5:
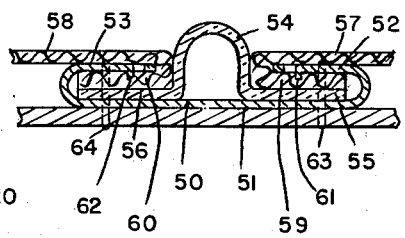
Figure 5 is a view similar to Figure 4 but showing a slight modification.

In Figure 5 I have illustrated a slight modification wherein the metal strip 50 has a flat base 51 provided at opposite longitudinal side edges thereof with open return bent flanges 52 and 53, respectively. A hollow bead or riser 54 corresponding in shape to the riser 34 and formed from plastic material is located on the base 51 between the flanges 52 and 53 and has lateral flanges 55 and 56 respectively between the flanges 52, 53 and the base 51 of the strip. The fabrics 57 and 58 extend over the flanges 52 and 53 of the strip, and have inturned edge portions 59 and 60 clamped between the flanges 52, 53 of the strip and the flanges 55, 56 of the bead. If desired, tangs 61 and 62 may be struck out from the flanges 52 and 53 of the strip to pierce and hold the inturned edge portions 59 and 60 of the fabrics 57 and 58. Also suitable fastening elements such as staples 63 and 64 may extend through the flanges 52, 53 of the strip, through inturned edge portions 59, 60 of the fabrics, through the flanges 55, 56 of the bead, and through the base 51 of the strip for engagement with the panel board 11 to hold the parts in assembled relation. The tangs 61 and 62 and staples 63 and 64 are also beneath and concealed by the fabrics 57 and 58.

As is well-known, plastics suitable for the beads 34 and 54 may be obtained in a wide variety of colors, hence this arrangement enables a manufacturer to produce any desired harmony or contrast between the covering, beads and trim fabrics.

The metallic strips previously described may be very cheaply constructed and the metal employed in them is, of course, very inexpensive. As a result, the material going to make up the trim panel is no more expensive than present day constructions which lack the flexibility of design in the present construction. In addition, the present strips lend themselves to very rapid assembly and do not require highly skilled labor. As a result, the labor costs of assembling the completed panels is no more expensive than present less attractive panels, and is in fact considerably less expensive than present types of assembly which obtain anything like equivalent results.

Reference was previously made to the fact that instead of employing metallic strips, strips of other material could be employed. By employing metallic strips, the interlock formed by the tangs 41, 42, 61, 62 is exceptionally efficient, but in its broader aspects the invention need not be practiced with metallic strips. If a strip of resinous material or adhesive coated bendable cardboard were employed, it would still be possible to obtain perfectly straight folded edges, which is very desirable in this type of construction. If the strips were formed of resinous material, the sealing bond could be obtained by the application of heat to the fabric overlying the folded strips. If adhesive were employed, it would be necessary only to apply sufficient pressure to cause initial setting of the adhesive.

It may also be mentioned that rubber may be employed as the locking medium. Thus, for example, the strips may be formed of any suitable material and provided with thin unvulcanized rubber coatings, or provided with a film of vulcanizing latex. The final assembly of the operation would then include the application of heat and pressure to vulcanize the rubber, thus forming a perfect bond between the strips and fabrics.

What I claim as my invention is:

1. In a trim structure, a foundation member, a metal strip having a base anchored on said member and provided at opposite longitudinal edges thereof with open return bent flanges, a raised bead between said flanges having lateral flanges between the base and return bent flanges, and trim fabrics extending over the return bent flanges and having inturned edge portions clamped between the flanges of the strip and the flanges of the bead.

2. In a trim structure, a foundation member, a metal strip having a base anchored on said member and having return bent flanges at opposite longitudinal edges thereof, a raised bead on said base between said flanges, said bead being formed from plastic material and having lateral flanges extending between the base and return bent flanges, and trim fabrics extending over the flanges and having inturned edge portions clamped between the flanges of the bead and the flanges of the strip.

3. In a trim structure, a foundation member, a metal strip having a base anchored on said member and having return bent flanges at opposite longitudinal edges thereof, a raised bead on said base between said flanges, the outer exposed portion of said bead being formed from plastic material, and trim fabrics extending over the flanges and having inturned edge portions upon opposite sides of the bead clamped between the base and return bent flanges of the strip.

4. In a trim structure, a strip having a flat base provided at opposite side edges thereof with open return bent flanges, a raised bead on the base between said return bent flanges and having lateral flanges between the base and return bent flanges, trim fabrics extending over the return bent flanges toward the bead and having inturned edge portions extending between the return bent flanges of the strip and the lateral flanges of the bead, a support for the strip and bead, and means beneath and concealed by the fabrics for securing the same and said strip and bead to said support, including means extending through the return bent flanges and base of said strip.

5. In a trim structure, a strip having a flat base provided at opposite side edges thereof with open return bent flanges, a raised bead on the base between said return bent flanges and having lateral flanges between the base and return bent flanges, trim fabrics extending over the return bent flanges toward the bead and having inturned edge portions extending between the return bent flanges of the strip and the lateral flanges of the bead, a support for the strip and bead, and means beneath and concealed by the fabrics for securing the same and said strip and bead to said support, including fasteners engaging the return bent flanges and base of the strip, the lateral flanges of the bead, and the inturned edge portions of the fabrics.

6. In a trim structure, a foundation member, separate trim fabrics extending over spaced areas of said member and having inturned edge portions spaced laterally apart, a metal strip extending lengthwise of and spanning the space between said inturned edge portions, said strip having a base on the foundation member underneath said inturned edge portions and having return bent flanges extending between the trim fabrics and the inturned edge portions thereof, a raised bead between the laterally spaced edge portions of the fabrics and having lateral flanges between the base of the metal strip and the inturned edge portions of the fabrics, and means beneath and concealed by the trim fabrics connecting the inturned edge portions thereof and the flanges respectively of the metal strip and bead to said foundation member, whereby the inturned edge portions of the fabrics are gripped between the flanges of the bead and the return bent flanges of said strip.

7. In a trim structure, a foundation member, separate trim fabrics extending over spaced areas of said member and having inturned edge portions spaced laterally apart, a metal strip extending lengthwise of and spanning the space between said inturned edge portions, said strip having a base on the foundation member underneath said inturned edge portions and having return bent flanges extending between the trim fabrics and inturned edge portions thereof, and a raised bead between the laterally spaced edge portions of said fabrics and having lateral flanges between the base of the metal strip and the inturned edge portions of the fabrics, the return bent flanges of the strip being connected to the foundation member whereby the inturned edge portions of the fabrics are gripped between the flanges of the bead and the return bent flanges of the metal strip.

8. In a trim structure, a foundation member, separate trim fabrics extending over spaced areas of said member and having inturned edge portions spaced laterally apart, a metal strip extending lengthwise of and spanning the space between said inturned edge portions, said strip having a base on the foundation member underneath said inturned edge portions and having return bent flanges extending between the trim fabrics and inturned edge portions thereof, a raised bead formed from plastic material located between the laterally spaced edge portions of the fabrics and having lateral flanges extending between the base of said strip and the inturned edge portions of said fabrics, and means connecting the return bent flanges of the strip to the foundation member so that the inturned edge portions of the fabrics are gripped between the flanges of the bead and the return bent flanges of the metal strip.

9. In a trim structure, a foundation member, a strip having a base anchored on said member and provided with open return bent flanges, a raised bead between said opposed flanges and having lateral flanges between the base and return bent flanges, and trim fabrics extending over the return bent flanges of the strip and having inturned edge portions clamped between the flanges of the strip and the flanges of the bead.

10. In a trim structure, a foundation member, a strip having a base on said member and provided with open return bent flanges, a raised bead between said opposed flanges and having lateral flanges between the base and return bent flanges, trim fabrics extending over the return bent flanges of the strip and having inturned edge portions between the flanges of the strip and the flanges of the bead, and means connecting the inturned edge portions of said fabrics and the flanges respectively of the strip and bead to said foundation member.

11. In a trim structure, an anchorage strip having a base provided with open return bent flanges, the opposed inner edges of said flanges being spaced laterally apart, trim fabrics extending over said flanges toward each other and having inturned edge portions extending around the laterally spaced edges of said flanges and disposed between the return bent flanges and base of the strip, a covering for the base of said strip having edge portions extending between the inturned edge portions of the fabrics and the base of said strip, a support for said strip, and means beneath and concealed by the fabrics for securing the inturned edge portions of the fabrics and said strip and covering to said support, including fasteners engaging the return bent flanges and base of said strip and anchored in said support.

EDWARD R. DETRICK.